US012671477B2

(12) United States Patent
Rekaya Ben-Othman et al.

(10) Patent No.: US 12,671,477 B2
(45) Date of Patent: Jun. 30, 2026

(54) METHOD AND SYSTEM FOR COORDINATED MULTI-POINT TRANSMISSION COORDINATION

(71) Applicant: INSTITUT MINES TELECOM, Palaiseau (FR)

(72) Inventors: Ghaya Rekaya Ben-Othman, Antony (FR); Aymen Askri, Palaiseau (FR); Chao Zhang, Orsay (FR)

(73) Assignee: INSTITUT MINES TELECOM, Palaiseau (FR)

( * ) Notice: Subject to any disclaimer, the term of this patent is extended or adjusted under 35 U.S.C. 154(b) by 247 days.

(21) Appl. No.: 18/274,729

(22) PCT Filed: Feb. 3, 2022

(86) PCT No.: PCT/EP2022/052604
§ 371 (c)(1),
(2) Date: Jul. 28, 2023

(87) PCT Pub. No.: WO2022/175102
PCT Pub. Date: Aug. 25, 2022

(65) Prior Publication Data
US 2024/0120979 A1 Apr. 11, 2024

(30) Foreign Application Priority Data
Feb. 19, 2021 (EP) ..................................... 21305203

(51) Int. Cl.
*H04B 7/06* (2006.01)
*H04B 17/336* (2015.01)

(52) U.S. Cl.
CPC ........... *H04B 7/0626* (2013.01); *H04B 7/063* (2013.01); *H04B 7/0632* (2013.01); *H04B 17/336* (2015.01)

(58) Field of Classification Search
None
See application file for complete search history.

(56) References Cited

U.S. PATENT DOCUMENTS

| | | | | |
|---|---|---|---|---|
| 2013/0111269 A1* | 5/2013 | Wu | ....................... | G06F 11/366 |
| | | | | 714/E11.178 |
| 2013/0148600 A1 | 6/2013 | Moulsley et al. | | |

FOREIGN PATENT DOCUMENTS

| | | |
|---|---|---|
| EP | 2 681 853 A1 | 1/2014 |
| WO | 2013/112829 A1 | 8/2013 |

OTHER PUBLICATIONS

"Technical Categorization for CSI enhancements MTRP and FR1 FDD reciprocity", R1-2007268, 3GPP TSG RAN WG1 Meeting #102-e, Huawei, 2020.

(Continued)

*Primary Examiner* — Minh Trang T Nguyen
(74) *Attorney, Agent, or Firm* — BakerHostetler

(57) ABSTRACT

A priority-resource-limited CoMP scheme is proposed based on a coordination priority index of users which comes into play to perform cooperation set selection and resource allocation in small cell networks. The CoMP control unit (CCU) configures and then transmits to the donor (serving) Transmission/Reception Point (TRP) the coordination priority index which is determined as a function of the required Bit Rate for that specific User Equipment and the SINR or the CQI. The donor Transmission/Reception Point (TRP) then transmits the coordination priority indexes sent by the CCU to the corresponding User Equipment (UE)s. The configuration of the coordination priority index allows the User Equipment to select a subset of Channel State Information reports or Channel State Information quantities to report so that the threshold index of the coordination priority is met.

12 Claims, 4 Drawing Sheets

(56)     References Cited

OTHER PUBLICATIONS

Goyal, 5G Quality of Services (Qos)—Jan. 5, 2020—retrieved Apr. 29, 2014 at http://web.archive.org/web/20230206232825/https://www.5gblogs.com:443/5g-quality-of-services-qos/.

Chiumento, et al., "Adaptive Channel State Information (CSI) and feedback estimation in LTE and beyond: a Gaussian process regression approach", EURASIP Journal on Wireless Communications and Networking, vol. 2015, No. 1, Article No. 168, 2015.

S. Chen, et al.; "Performance Analysis of Downlink Coordinated Multipoint Joint Transmission in Ultra-Dense Networks"; IEEE Network; vol. 31; No. 5; Aug. 2017; pp. 1-19.

Publication R1-2005281 Channel State Information (CSI) feedback enhancements for URLLC; e-Meeting held Aug. 17-28, 2020; pp. 1-6.

* cited by examiner

FIG. 1
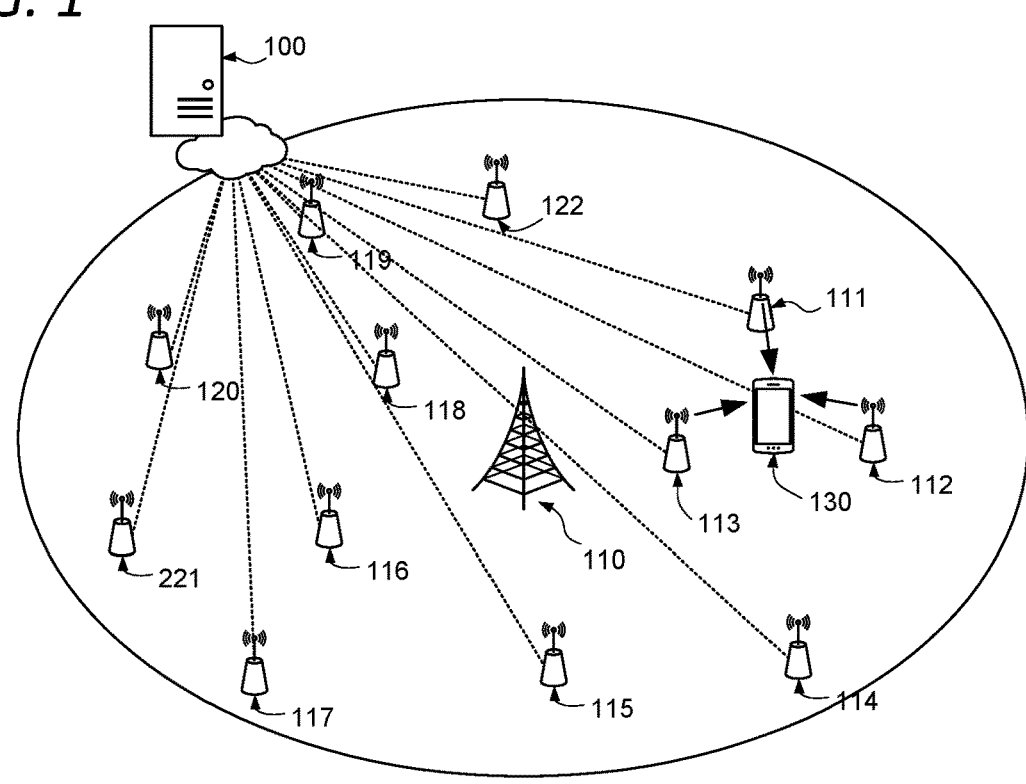
FIG. 2
FIG. 3
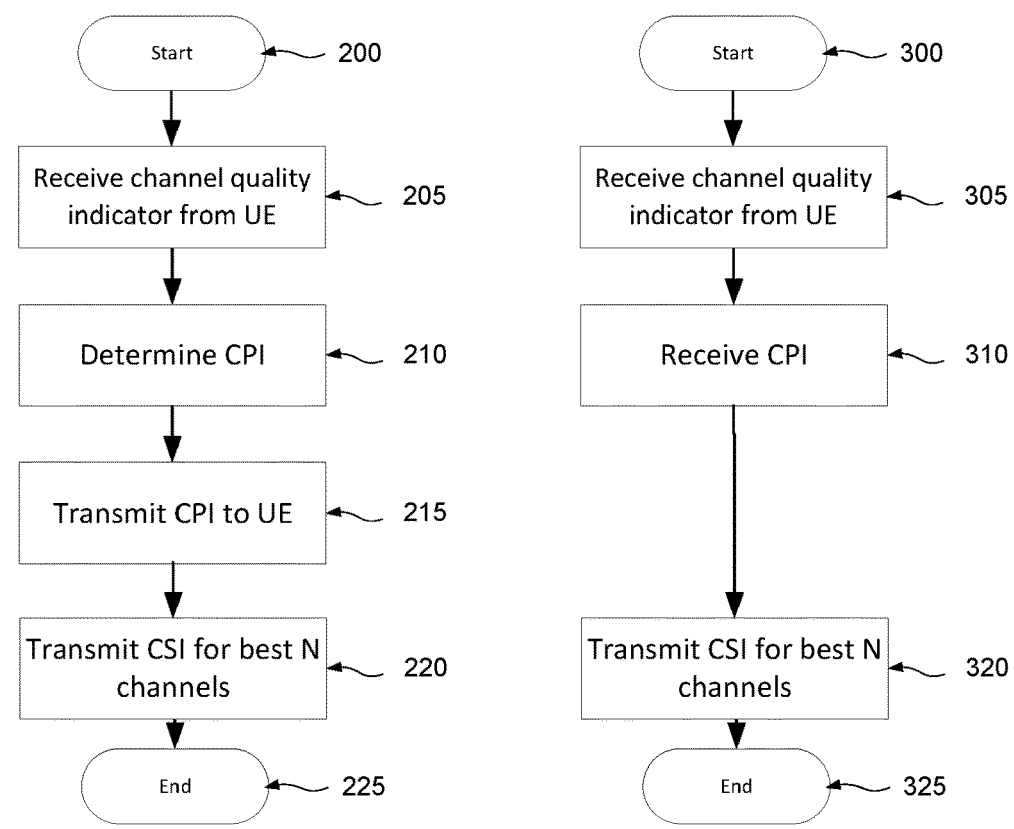

METHOD AND SYSTEM FOR COORDINATED MULTI-POINT TRANSMISSION COORDINATION

CROSS-REFERENCE TO RELATED APPLICATIONS

This application is a National Stage of International patent application PCT/EP2022/052604, filed on Feb. 3, 2022, which claims priority to foreign European patent application No. EP 21305203.8, filed on Feb. 19, 2021, the disclosures of which are incorporated by reference in their entireties.

FIELD OF THE INVENTION

The present invention relates to coordinated multi-point transmission schemes and the optimization of cooperation set selection and resource allocation in small cell networks.

BACKGROUND OF THE INVENTION

Forthcoming mobile communication systems will be expected to provide ubiquitous connectivity and seamless service delivery in all circumstances. The large number of devices and the coexistence of human-centric and machine type applications expected will lead to a large diversity of communication scenarios and characteristics. In this context, many advanced communication techniques are under investigation. Each of these techniques is typically optimised for a subset of the foreseen communication scenarios.

More recent LTE-A and 5G NR based cellular networks envisage coordinated multi-point (CoMP) transmission to approach universal frequency reuse which could be deployed in intra-cell and also in inter-cell scenarios. In this perspective, multi-Transmission/Reception Point (TRP) transmission schemes such as Non-Coherent Joint-Transmission and dynamic point selection or muting can be used by the network in order to reap the benefits of diversity gain and avoid blockage. 5G NR Rel-16 supports both single-PDCCH and multiple-PDCCH based multi-Transmission/Reception Point (TRP), Single-PDCCH or Single-DCI multi-Transmission/Reception Point (TRP) assumes good backhaul conditions wherein different layers, frequency resources or transmissions of PDSCH are mapped to different Transmission/Reception Point (TRP)s or panels. Multiple-PDCCH/M-DCI based multi-Transmission/Reception Point (TRP) can be used with both ideal and non-ideal backhaul and assumes minimum exchange of information among Transmission/Reception Points (TRP). In the latter case, PDSCH transmission by each Transmission/Reception Point (TRP) can be independent.

FIG. 1 shows a small cell network with CoMP transmission.

FIG. 1 presents a typical small cell network configuration in which CoMP transmission may occur, where small cells and users are covered by a macro Transmission/Reception Point (TRP) 110 equipped with a CoMP control unit (CCU) 100 to provide clustering decisions may be envisaged. Small cells 111, 112, 113, 114, 115, 116, 117, 118, 119 120 are uniformly deployed in the macro-cell 110 and user equipment elements 130 are randomly distributed in each cell. Rayleigh fading may be considered to model the channels between Transmission/Reception Points and users.

Several downlink CoMP schemes are developed in the 3GPP. We can note for example the joint transmission (JT), the dynamic point selection/blanking (DPS/DPB), and the coordinated scheduling/beam-forming (CS/CB). The base-line Rel-15 NR scheme uses the DPS, where a User Equipment (UE) can be dynamically served by one of multiple Transmission/Reception Point (TRP)s which temporarily offers the best channel conditions to the User Equipment (UE) in a coordination cluster. Generally, the DPS is jointly operated with the DPB CoMP scheme where dynamic decisions are made to not schedule any User Equipment (UE)s from one or more Transmission/Reception Point (TRP)s. This has the advantage to reduce the interference to User Equipment (UE)s served by the remaining Transmission/Reception Point (TRP)s.

While for DPS/DPB, the User Equipment (UE) only receives transmissions from one Transmission/Reception Point (TRP) at a certain time, in joint transmission, the User Equipment (UE) is simultaneously served by multiple Transmission/Reception Points. Two groups for the joint transmission technique are defined: coherent joint transmission (CJT) and non-coherent joint transmission (NCJT). CJT performs joint beamforming from all coordinated Transmission/Reception Points, which can be regarded as one large distributed MIMO system. In NCJT, single codewords are transmitted over layers coming from different Transmission/Reception Points to the target User Equipment (UE) which makes the requirement for synchronization and Channel State Information (CSI) accuracy lower comparable to CJT.

In all of the mentioned multi-Transmission/Reception Point (TRP) schemes, DL Channel State Information (CSI) is very important. The network needs to obtain Channel State Information (CSI) quantities for each of the transmission/interference hypotheses. Each transmission/interference hypothesis can be characterized by a given combination of QCL assumption(s) of CMR and/or IMR. Only then can the network make optimal scheduling decisions, which in the framework of multi-Transmission/Reception Point (TRP), includes deciding the number of layers to be received from each Transmission/Reception Point (TRP).

As the number of cooperating Transmission/Reception Points and the number of beams per Transmission/Reception Point (TRP) increases, obtaining full Channel State Information (CSI) for all possible interference hypothesis becomes onerous, especially in terms of uplink reporting resources. This prompted the 3GPP RAN1 project to work on Channel State Information (CSI) enhancements for multi-Transmission/Reception Point (TRP) in Rel-17. Following the deliberations of the 3GPP RAN1 #102-e, a high-level categorization of various proposals produced two main categories of schemes for Channel State Information (CSI) enhancements for multi-Transmission/Reception Point (TRP) published as "R1-2007268 Technical Categorization for Channel State Information (CSI) enhancements for Transmission/Reception Point" and "FR1 FDD reciprocity Huawei". The first category may generally consider a single Channel State Information (CSI) report configuration wherein one or more Channel State Information (CSI) reporting quantities based on pre-defined/indicated/configured/User Equipment (UE)-selected channel and interference hypotheses are associated with different Transmission/Reception Points. The second category considers multiple Channel State Information (CSI) reports to report multiple Channel State Information (CSI) reporting quantities based on pre-defined/indicated/configured/User Equipment (UE)-selected channel and interference hypotheses.

The achievable performance of multi-Transmission/Reception Point (TRP) schemes depends on the reported Channel State Information (CSI) at the scheduler. It goes without saying that having full Channel State Information (CSI) feedback regarding each transmission/interference hypothesis will enable the network to make a better choice of the transmission scheme for each User Equipment (UE). Such a situation would enable the network to achieve near-optimal performance, depending on the scheduling algorithm. Nevertheless, this entails i) More information to be exchanged over the network backhaul ii) Large uplink reporting overhead due to Channel State Information (CSI) reports iii) Additional complexity required by the scheduling algorithm Consequently, Channel State Information (CSI) enhancements for multi-Transmission/Reception Point (TRP) are desirable.

The JT CoMP technique is difficult to apply in practice due to the bottleneck of backhaul capacity and radio resource at each Transmission/Reception Point (TRP). Different ways to select Transmission/Reception Point (TRP)s have been covered in the literature.

A traditional way is to choose the Transmission/Reception Points with the N highest values of the reference signal received power (RSRP), which is called the N-best way, as described for example in the article by S. Chen, T. Zhao, H. H. Chen, Z. Lu, and W. Meng. Entitled "Performance analysis of downlink coordinated multipoint joint transmission in ultra-dense networks." Published in IEEE Netw., vol. 31, no. 5, pp. 106-114,2017. The fairness to users is poor when employing this method, especially in a network with resource restrictions. The objective for initial deployments is coverage, and later it becomes the spectral efficiency enhancement. Cell-edge User Equipments (UE) are first identified and then perform joint transmission for these User Equipments. In a traditional macro-cell-only network, one can easily identify the cell-edge User Equipment (UE)s based on their distances from a central macro Transmission/Reception Point (TRP). However, in small cell networks, the distances between Transmission/Reception Points can be short, and even the User Equipments located on the cell boundary may have short distances from a central Transmission/Reception Point (TRP). The non-uniform distribution of Transmission/Reception Point (TRP)s can make it more difficult to identify cell-edge users, as the distances between adjacent Transmission/Reception Point (TRP)s may vary significantly and we cannot find a universally applicable threshold. Thus, it is extremely hard to determine which User Equipment (UE)s need to perform joint transmission in small cell networks. Another disadvantage of choosing N-best Transmission/Reception Point (TRP)s is that the number of cooperative Transmission/Reception Point (TRP)s is a fixed value of N. Clearly, if N is equal to the number of dominant interferers, SINR performance cannot be improved significantly when increasing the value of N.

Another way to select Transmission/Reception Points is that a User Equipment (UE) is associated with Transmission/Reception Point (TRP)s whose received power is above a given threshold. Thus the number of serving Transmission/Reception Points is not a fixed value of N. A User Equipment (UE) is more likely to have more serving Transmission/Reception Points, where the density of Transmission/Reception Points is higher. The benefit of this approach is that inter-cell interference can be effectively transformed to the desired signal, and thus SINR can be improved significantly. However, the only consideration when choosing cooperative Transmission/Reception Point (TRP)s is the distance between a User Equipment (UE) and Transmission/Reception Point (TRP). In other words, it does not consider whether the User Equipment (UE) is located near the cell boundary or not. The cell-edge User Equipment (UE)s have poorer SINR, and therefore a higher priority for using JT. As to User Equipment (UE)s located near Transmission/Reception Point (TRP), there is little need to perform JT, as it may be a waste of resources for Transmission/Reception Point (TRP)s. Meanwhile, the determination of a proper threshold is another challenge since the condition of wireless channels is changing all time. If the threshold is set too high, some User Equipments may have no serving Transmission/Reception Point (TRP). If the threshold is set too low, User Equipments are more likely to be associated with multiple Transmission/Reception Points, and thus each Transmission/Reception Point (TRP) tends to serve more User Equipments, which may cause overload to Transmission/Reception Points.

Different aspects are studied in 3GPP project RAN1 #102-e for Channel State Information (CSI) enhancements for multi-Transmission/Reception Point taking into account trade-off among User Equipment (UE) complexity, performance and reporting/RS overhead.

A state of the art approach is known from the publication "R1-2005281 Channel State Information (CSI) feedback enhancements for URLLC." This document suggests that is that the User Equipment (UE) reports cooperative Channel State Information (CSI) corresponding to network cooperative transmission. This cooperative Channel State Information (CSI) can help set the Modulation and Encoding Scheme (MCS) more accurately when the network adopts the cooperative transmission which corresponds to the cooperative Channel State Information (CSI). For example, to avoid the User Equipment (UE) reporting only the most "selfish" Channel State Information (CSI), such that all NZPs for channel measurement (CM), the network may configure a certain reporting criteria/requirement (such as the three highest CQIs, or one CQI in the range of 25~30 dB and another CQI in the range of 20~25 dB), and the User Equipment (UE) report the resulting Channel State Information (CSI) and the determinations in the Channel State Information (CSI) reporting. Then the network can select the cooperative Transmission/Reception Point (TRP)s accordingly based on the reported CQIs and some particular URLLC requirements.

It is desirable to improve the Channel State Information (CSI) reporting mechanism with a view to one or more of reducing information to be exchanged over the network backhaul, reducing uplink reporting overhead and reducing scheduling algorithm complexity.

SUMMARY OF THE INVENTION

In accordance with the present invention in a first aspect there is provided a method of communicating channel state information in a cellular communications system comprising a plurality of Transmission/Reception points, in which a user equipment may be in simultaneous respective communications with multiple Transmission/Reception points, the communications being coordinated on the basis of the channel state information transmitted by the user equipment. The method of this aspect comprises receiving a channel quality indicator from the user equipment representative of a Signal to Interference and Noise Ratio of a communication, where the channel quality indicator is the channel quality indicator associated with a preferred channel, the preferred channel being the one of the communications having highest channel quality, determining a coordination priority index proportional to a Bit Rate requirement associated with the user equipment and inversely proportional to the Signal to Interference and Noise Ratio, rounded to an integer, transmitting the coordination priority index to the user equipment, and the user equipment transmitting channel state information relating to respective communications, communications with respect to which channel state information is transmitted correspond to communications having the highest channel state information values, and where the number of communication channels with respect to which channel state information is transmitted is equal to or less than the coordination priority index. In a development of the first aspect the method comprises the further steps of transmitting selection criteria to the User Equipment, and the User Equipment applying the criteria to define the transmitted channel state information as a selection of a subset of Channel State Information reports and/or Channel State Information quantities.

In a development of the first aspect the system is further configured to assign communications of a the User Equipment to a plurality of Transmission/Reception points, with regard to the reported Channel State Information of the respective User Equipment, and the coordination priority index of the respective User Equipment.

In a development of the first aspect the step of assigning communications of a User Equipment to a plurality of Transmission/Reception points comprises preferentially assigning multiple Transmission/Reception points to a user equipment with a higher coordination priority index over a user equipment with a lower coordination priority index.

In accordance with the present invention in a second aspect there is provided a method of communicating channel state information in a cellular communications system comprising a plurality of Transmission/Reception points, in which a user equipment may be in simultaneous respective communications with multiple Transmission/Reception points, the communications being coordinated on the basis of the channel state information transmitted by the user equipment. The method of this aspect comprises the user equipment transmitting a channel quality indicator representative of a Signal to Interference and Noise Ratio of a the communication, where the channel quality indicator is the channel quality indicator associated with a preferred channel, the preferred channel being the one of the communications having highest channel quality, receiving a coordination priority index at the user equipment, the coordination priority index being proportional to a Bit Rate requirement associated with the user equipment and inversely proportional to the Signal to Interference and Noise Ratio, rounded to an integer, and the user equipment transmitting channel state information relating to respective communications, communications with respect to which channel state information is transmitted correspond to communications having the highest channel state information values, and where the number of communication channels with respect to which channel state information is transmitted is equal or less than the coordination priority index.

In a development of the second aspect the method comprises the further steps of receiving selection criteria at the User Equipment, and the User Equipment applying the criteria to define the transmitted channel state information as a selection of a subset of a Channel State Information reports and/or Channel State Information quantities.

In a development of the first or second aspects, the Signal to Interference and Noise Ratio is determined on the basis of a predetermined mapping of channel quality indicator values to Signal to Interference and Noise Ratio values.

In a development of the first or second aspects, the Signal to Interference and Noise Ratio is determined by a calculation corresponding to the type of user equipment.

In a further development of the first or second aspects, the coordination priority index is equal to a Bit Rate requirement associated with the user equipment divided by the sum rate of the preferred channel, rounded to an integer.

In accordance with the present invention in a third aspect there is provided a computer program comprising instructions which, when the program is executed by a computer, cause the computer to carry out the method of the first or second aspect.

In accordance with the present invention in a fourth aspect there is provided cellular communications system comprising a plurality of Transmission/Reception points, in which a user equipment may be in simultaneous respective communications with multiple Transmission/Reception points, the communications being coordinated on the basis of the channel state information transmitted by the user equipment. The system of this aspect is adapted to receive a channel quality indicator from the user equipment representative of a Signal to Interference and Noise Ratio of a communication, where the channel quality indicator is the channel quality indicator associated with a preferred channel, the preferred channel being the one of the communications having highest channel quality, to determine a coordination priority index proportional to a Bit Rate requirement associated with the user equipment and inversely proportional to the Signal to Interference and Noise Ratio, rounded to an integer, to transmit the coordination priority index to the user equipment, and wherein the user equipment is configured to transmitting channel state information relating to respective communications, where the communications with respect to which channel state information is transmitted correspond to communications having the highest channel state information values, and where the number of communication channels with respect to which channel state information is transmitted is equal or less than the coordination priority index.

In accordance with the present invention in a fifth aspect there is provided user equipment for use in a cellular communications system comprising a plurality of Transmission/Reception points, in which a user equipment may be in simultaneous respective communications with multiple Transmission/Reception points, the communications being coordinated on the basis of the channel state information transmitted by the user equipment. The user equipment of this aspect is adapted to transmit a channel quality indicator representative of a Signal to Interference and Noise Ratio of a communication, where the channel quality indicator is the channel quality indicator associated with a preferred channel, the preferred channel being the one of the communications having highest channel quality. The user equipment is further adapted to receive a coordination priority, the coordination priority index being proportional to a Bit Rate requirement associated with the user equipment and inversely proportional to the Signal to Interference and Noise Ratio, rounded to an integer. The user equipment is further adapted to transmit channel state information relating to respective communications, communications with respect to which channel state information is transmitted correspond to communications having the highest channel state information values, and where the number of communication channels with respect to which channel state information is transmitted is equal or less than the coordination priority index.

BRIEF DESCRIPTION OF THE DRAWINGS

The above and other advantages of the present invention will now be described with reference to the accompanying drawings, in which:

FIG. 1 shows a small cell network with CoMP transmission;

FIG. 2 shows a method of communicating channel state information in a cellular communications system in accordance with an embodiment;

FIG. 3 shows a method of communicating channel state information in a cellular communications system in accordance with an embodiment from the point of view of a User Equipment;

DETAILED DESCRIPTION

Figure 4:
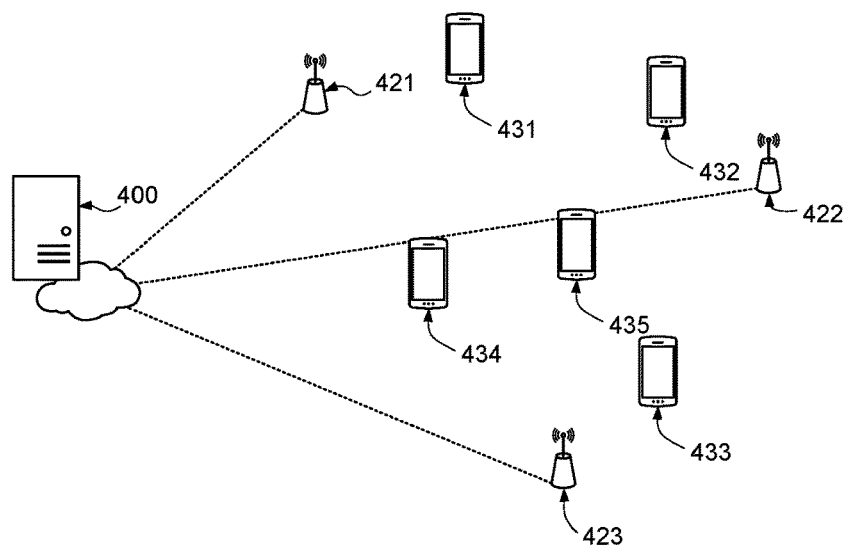
FIG. 4 presents an illustrative example based on certain embodiments.

Embodiments provide a priority-resource-limited CoMP scheme based on a coordination priority index of users which streamlines reporting in small cell networks.

FIG. 2 shows a method of communicating channel state information in a cellular communications system in accordance with an embodiment.

As shown in FIG. 2, there is provided a method of communicating channel state information in a cellular communications system comprising a plurality of Transmission/Reception points, for example as described above with reference to FIG. 1, in which a user equipment may be in simultaneous respective communications with multiple Transmission/Reception points, the communications being coordinated on the basis of channel state information transmitted by the user equipment.

A shown in FIG. 2, the method begins at step 200 before proceeding to step 205 of receiving a channel quality indicator from a user equipment representative of a Signal to Interference and Noise Ratio of a communication, where the channel quality indicator is the channel quality indicator associated with a preferred channel, the preferred channel being the one of the communications in which the UE is engaged having highest channel quality. The method next proceeds to step 210 at which a coordination priority index proportional to a Bit Raterequirement associated with the user equipment and inversely proportional to the Signal to Interference and Noise Ratio, rounded to an integer, is determined.

As discussed above the proposed scheme makes use of a parameter configured at the network side for example at the CoMP control unit (CCU) side, which may be referred to as a coordination priority index of users. This parameter is configured as a function of the required Bit Rate of each user and its SINR without cooperation considering that the user associates itself with the donor Transmission/Reception Point (TRP) which provides him the strongest reference signal received power (RSRP).

The skilled person will appreciate that various definitions of a coordination priority index proportional to a Bit Rate requirement associated with the user equipment and inversely proportional to the Signal to Interference and Noise Ratio, rounded to an integer may be envisaged, from which he may select as a function of the specific desired behavior of the system, in particular as concerns the relative importance of the Bit Rate requirement associated with the user equipment on one hand, and the Signal to Interference and Noise Ratio on the other. As one example, the coordination priority index of each kth user might be configured as $$\omega_k = \frac{\gamma_k}{\log_2\left(1 + SINR_k^0\right)}$$

where $$SINR_k^0$$

is the SINR of the kth user expressed for example in watts without cooperation which could be estimated as a function of the reported CQI, and $\gamma_k$ is the required Bit Rate of the kth user which determines the minimum traffic required to satisfy that specific user.

The skilled person will appreciate that alternative definitions of Coordination Priority Index may be envisaged. By way of an example of an alternative definition, the following may be used $$w_k = \frac{\gamma_k}{R_k^0},$$

where $$R_k^0$$

is the achievable rate of the kth user without cooperation.

The skilled person will appreciate that in view of the Shannon capacity formula Rk=B log$_2$ (1+SINR$_k^0$, where B is the Bandwidth, this alternative definition still constitutes a definitions of a coordination priority index proportional to a Bit Rate requirement associated with the user equipment and inversely proportional to the Signal to Interference and Noise Ratio.

Accordingly, the network may indicate to a User Equipment (UE) the coordination priority index which is calculated by the network as a function of Bit rate requirements derived from QoS SINR derived from CQI QoS Requirements During the evolution of QoS management mechanism in 3GPP (GSM/UMTS/LTE) networks there was a migration from QoS management at the User Equipment (UE) level to the QoS management at the network level. This approach to QoS management will be maintained in 5G networks as well. QoS management mechanisms in 5G networks should provide video and Vol P traffic prioritization towards Web-search traffic and other applications tolerant to quality.

In general, the quality of a voice or data transmission can be evaluated and controlled in various ways. However, availability of transmission with a given coverage is a first indicator for its quality. The end-to-end quality of transmission can be managed by different IP QoS paradigms.

The QoS itself can be defined a series of parameters of network and service performance indicators which determines the degree of service fulfillment. QoS management in communication networks is based on the fact that different application types and different performance levels are required by the users of different services. Fundamental parameters are reliability (transmission link erroneousness) and throughput/delay requirements. Services which having strict delay and reliability requirements are regarded to real time classes, while services characterized by high reliability and relaxed delay requirements are categorized as non-real time services. Real time traffic classes can ask for guaranteed bit rate to ensure required service performance while non-real time traffic classes cannot.

5G uses QoS Flows, each identified by a QoS Flow Identifier (QFI). In http://5gblogs.com/5a-quality-of-ser-vices-gas/an example of the 5G QoS Flow Characteristics (resource type, priority level, packet delay budget, packet error rate, averaging window, maximum data burst volume) is shown.

In particular, the QoS defines a required or guaranteed bit rate, and it is this element of QoS that may be used the basis of CPI calculations in accordance with embodiments presented herein.

SINR Derived from CQI

As stated above, the Channel Quality indicator is representative of a Signal to Interference and Noise Ratio of the channel having highest channel quality as seen by the User Equipment. Strictly speaking, the manner in which the Channel Quality indicator is calculated at a given User Equipment is determined by the configuration of that device, as set by the device manufacturer. On this basis, in some embodiments the Signal to Interference and Noise Ratio may be is determined on the network side by a reverse calculation corresponding to the type of the user equipment. This might make reference to a database of CQI calculations by device type.

Alternatively, the Signal to Interference and Noise Ratio may be determined on the basis of a predetermined mapping of channel quality indicator values to Signal to Interference and Noise Ratio values. For example, Table 1 below, as drawn from the article by A. Chiumento, M. Bennis, C. Desset, L. Van der Perre, and S. Pollin.entitled "Adaptive Channel State Information (CSI) and feedback estimation in LTE and beyond: a Gaussian process regression approach." Published in *EURASIP Journal on Wireless Communications and Networking*, vol. 2015, no. 1, pp. 168, 2015. shows an example of the effective SINR which is quantized into a channel quality indicator (CQI) value, indicative of the highest modulation and code rate the Transmission/Reception Point (TRP) may use while keeping a packet error rate (PER) below a target of 10%.

TABLE 1

| SINR and CQI mapping to modulation and coding rate | | | | |
|---|---|---|---|---|
| SINR (w) | CQI | Modulation | Code rate | Efficiency (information bits per symbol) |
| 0.202 | 1 | QPSK | 78 | 0.1523 |
| 0.305 | 2 | QPSK | 120 | 0.2344 |
| 0.4808 | 3 | QPSK | 193 | 0.3770 |
| 0.7493 | 4 | QPSK | 308 | 0.6016 |
| 1.1915 | 5 | QPSK | 449 | 0.8770 |
| 1.8616 | 6 | QPSK | 602 | 1.1758 |
| 2.9471 | 7 | 16QAM | 378 | 1.4766 |
| 4.4926 | 8 | 16QAM | 490 | 1.9141 |
| 7.1994 | 9 | 16QAM | 616 | 2.4063 |
| 10.8792 | 10 | 64QAM | 466 | 2.7305 |
| 16.9394 | 11 | 64QAM | 567 | 3.3223 |
| 26.1396 | 12 | 64QAM | 666 | 3.9023 |
| 38.7971 | 13 | 64QAM | 772 | 4.5234 |
| 60.4505 | 14 | 64QAM | 873 | 5.1152 |
| 96.1390 | 15 | 64QAM | 948 | 5.5547 |

In any case, the definition of the coordination priority index as proportional to the required Bit Rate, and inversely proportional to the SINR means that User Equipments with low Bit Rate requirements will tend to report fewer Channel State Information (CSI) quantities/reports, and User Equipments with high Bit Rate requirements will tend to report many Channel State Information (CSI) quantities/reports, while User Equipments with low SINR will tend to report many Channel State Information (CSI) quantities/reports, and User Equipments with high SINR will tend to report fewer Channel State Information (CSI) quantities/reports.

The method then proceeds to step 215 at which the coordination priority index is transmitted to the user equipment, and then to step 220 at which the user equipment transmits channel state information relating to respective communications, communications with respect to which channel state information is transmitted correspond to communications having the highest channel state information values, and where the number of communication channels with respect to which channel state information is transmitted is equal or less than the coordination priority index.

Accordingly, the configured coordination priority index of each user is then transmitted by the Transmission/Reception Point (TRP) in downlink signaling to the User Equipment (UE) to let him select a subset of Channel State Information (CSI) reports or Channel State Information (CSI) quantities to report so that the threshold index of the coordination priority is met.

Embodiments provide a priority-resource-limited CoMP scheme based on a coordination priority index of users which may also come into play to perform cooperation set selection and resource allocation in small cell networks. The coordinated clustering among all Transmission/Reception Point (TRP)s is decided by the CCU. In accordance with certain embodiments, the clustering may take into account in addition to the reported Channel State Information (CSI), the new CPI parameter which reflects the coordination priority of each user. For example, the user with the lower CPI (lower priority) should be considered first at the CoMP control unit (CCU) to reduce the number of coordinated Transmission/Reception Points.

The downlink scheme of a two-tier heterogeneous network may be considered where Small Base Stations (SBSs) and users are covered by a Macro Base Stations (MBS). The SBSs are uniformly deployed in the macro-cell, and users are randomly distributed in each cell, for example as described with reference to FIG. 1 above. The Macro Base Station is used to treat the control signalling, and the Small Base Stations provide users with the required data services. Each MBS is equipped with a CoMP control unit (CCU) to provide clustering decisions on the behaviour of SBSs which are connected to the CCU through backhaul links.

Coordinated clustering among all Transmission/Reception Point (TRP)s may thus be decided by the or each CCU in accordance with the following algorithm.

Multiple SBSs may be selected to form a cooperation set and serve a user. The non-overloaded SBSs which have the strongest received powers should be assigned. The user with a smaller value of priority should be considered first at the CCU to reduce the number of serving SBSs. In this way, the users with better channel conditions are served by a few numbers of SBSs, whereas more SBSs serve the users with bad channel conditions. This has the advantage to reduce the backhaul traffic of an SBS. Exemplary pseudo-code of a proposed priority resource limited CoMP scheme is detailed as follows:

natively be determined at the User Equipment, and transmitted to the CCU.

$$\sum_{k=1}^{K} c_{km}$$

is the number of users simultaneously served by the mth SBS at a certain time.

On this basis it will be appreciated that the backhaul traffic of Small Base Station SMSm may be expressed as $$T_m^b = \sum_{k=1}^{K} c_{km} \Omega_k R_k$$

where $R_k$ is the rate of User k.

Accordingly, there may be provided a method assigning each of a plurality of User Equipments to one or more Transmission/Reception points in a cellular communications

| Algorithm 1. | |
|---|---|
| 1. for k=1:K do | Loop through all of the User Equipments (to determine CPIs) |
| 2.     calculate the coordination priority index $\omega_k$ of the $k_{th}$ user | |
| 3.     end for | |
| 4. sort users in ascending order of CPI | |
| 5. $B_k \leftarrow \Phi, C \leftarrow [0]_{K \times M}$ | Clear Bk and 0 |
| 6. for k=1:K do | Loop through all of the User Equipments (to perform clustering) |
| 7.     $N \leftarrow 1$ | Initialize number of SBS serving user under consideration (k) to 1 |
| 8.     while $\sum_{m=1}^{K} c_{km} < N$ do | |
| 9.         find the index m with the Nth largest RSRP | Choose next most powerful available SBS |
| 10.         calculate the achievable rate $R_k$ with $B_k$ | Achievable rate across selected cooperation set of SBS |
| 11.         calculate the required number of Physical Resource Blocks $\Omega_k$ to be provided by each SBS | |
| 12.         if the mth BS can provide $\Omega_k$ PRBs then | |
| 13.             $B_k \leftarrow B_k \cup BS_m$ | Add base station under consideration to cooperation set. |
| 14.             $c_{km} \leftarrow 1$ | |
| 15.         end if | |
| 16.         if $\gamma_k \le \Omega_k R_k$ then | If the required bit rate is equal to or less than to rate provided by the selected base stations- proceed to next user. |
| 17.             end while | |
| 18.         else | |
| 19.             $N \leftarrow N + 1$ | increment number of Base stations serving user under consideration (k) by 1 |
| 20.         end if | |
| 21.     end while | |

Where m is the index of a Small Base Station under consideration k is the index of a User Equipment under consideration $B_k$ is the cooperation set of Small Base Stations serving the $k_{th}$ user C is the matrix $C \in \mathbb{R}^{K \times M}$ where the coefficient $C_{km}$ has the value 1 when Small Base Station SBS m belongs to $B_k$, and the value 0 when $SBS_m$ does not belong to $B_k$ $\omega_k$ is the Coordination Priority Index of the $k_{th}$ user, determined for example as described above. It may be borne in mind that in some cases the CPI may altersystem comprising a plurality of Transmission/Reception points, the method comprising: determining a coordination priority index for each User Equipment reflecting a ratio between a Bit Rate requirement associated with the user equipment and inversely proportional to the Signal to Interference and Noise Ratio, rounded to an integer, and considering each User Equipment in order of coordination priority index, starting with the User Equipment with the lowest coordination priority index, and for each user equipment selecting the smallest set of Transmission/Reception points that operating at full physical block capacity can meet the user equipment's requirements, such that a greater number of Transmission/Reception points are assigned preferentially to User Equipments with poor Signal to Interference and Noise Ratio conditions.

Accordingly, in certain embodiments, there may be provided a further step, performed for example at the CCU, of assigning communications of a User Equipment to a plurality of Transmission/Reception points, with regard to the reported Channel State Information of the respective User Equipment, and the coordination priority index of the respective User Equipment. Still further, the step of assigning communications of a User Equipment to a plurality of Transmission/Reception points may comprise preferentially assigning multiple Transmission/Reception points to a user equipment with a lower coordination priority index over a user equipment with a higher coordination priority index. Still further, the step of assigning communications of a User Equipment to a plurality of Transmission/Reception points may comprise considering each User Equipment in order of coordination priority index, starting with the User Equipment with the lowest coordination priority index, and for each user equipment selecting the smallest set of Transmission/Reception points that operating at full physical block capacity can meet the user equipment's requirements, such that a greater number of Transmission/Reception points are assigned preferentially to User Equipments with poor Signal to Interference and Noise Ratio conditions.

For example, if the User Equipment (UE) is triggered with multiple Channel State Information (CSI) reports, with a coordination priority index of value 3, then the User Equipment (UE) will only feedback the reports considering the 3 best CQI indexes.

It will be appreciated that the method of FIG. 2 is presented from the point of view of the system, and that an equivalent method may be presented from the point of view of the User Equipment.

FIG. 3 shows a method of communicating channel state information in a cellular communications system in accordance with an embodiment from the point of view of a User Equipment. The method is implemented in a system comprising a plurality of Transmission/Reception points, in which a user equipment may be in simultaneous respective communications with multiple Transmission/Reception points, the communications being coordinated on the basis of the channel state information transmitted by the user equipment.

As shown, the method starts at step 300 before proceeding to step 305 at which the user equipment transmits a channel quality indicator representative of a Signal to Interference and Noise Ratio of a communication, where the channel quality indicator is the channel quality indicator associated with a preferred channel, the preferred channel being the one of the communications having highest channel quality (for example as described above). The method then proceeds to step 310 at which a coordination priority index is received at the user equipment, the coordination priority index being proportional to a Bit Raterequirement associated with the user equipment and inversely proportional to the Signal to Interference and Noise Ratio, rounded to an integer (for example as described above). The method next proceeds to step 320 at which the user equipment transmits channel state information relating to respective communications. The communications with respect to which channel state information is transmitted correspond to communications having the highest channel state information values, and where the number of communication channels with respect to which channel state information is transmitted is equal or less than the coordination priority index. The method then terminates at step 325.

According to certain embodiments for example based on those presented above, criteria for the selection of Channel State Information (CSI) reports by User Equipment (UE) in multi-Transmission/Reception Point (TRP) scenarios are provided. This selection may be performed when introducing the coordination priority index configured by the network and reported to the User Equipment (UE). This new parameter has the advantage to reduce the Channel State Information (CSI) reporting overhead in multi Transmission/Reception Point (TRP)s systems, and also to be used by the CoMP control unit (CCU) to minimize the backhaul networks.

According to certain embodiments for example based on those presented above, in addition to defining the number of channels for which CSI information should be transmitted by the User equipment, the method may comprise the further steps of transmitting selection criteria to the User Equipment, and the User Equipment applying the criteria to define the transmitted channel state information as a selection of a subset of a Channel State Information reports and/or Channel State Information quantities. For example, the network may constrain User Equipment Channel State Information (CSI) reporting depending on the preferred Modulation and Encoding Scheme (MCS) range that the network wants to use to serve the User Equipment (UE). From the network point of view, the preferred Modulation and Encoding Scheme (MCS) would depend on User Equipment (UE) traffic type (QoS requirements, target Block Error Rate (BLER), throughput requirements). The criterion indication may be performed in RRC configuration/reconfiguration, DCI triggering the Channel State Information (CSI) reporting or MAC CE. By this means, the network maintains control over the selection criterion.

When triggered/configured with Channel State Information (CSI) reporting for multi-Transmission/Reception Point (TRP), the User Equipment (UE) may compute all Channel State Information (CSI) quantities in the single or multiple Channel State Information (CSI) reports and as described above may select a subset of Channel State Information (CSI) quantities or Channel State Information (CSI) reports for which the criterion is satisfied.

The proposed scheme is useful for many applications such as MU-MIMO communications and multi-Transmission/Reception Point (TRP) scenarios. It could be of great interest in NR 5G systems.

As mentioned above, a benefit of certain embodiments lies in Overhead reduction of Channel State Information (CSI) report configuration of a User Equipment (UE). An illustrative example will now be considered, in which Channel State Information (CSI) report configuration of a User Equipment (UE) is presented with reduced overhead.

FIG. 4 presents an illustrative example based on certain embodiments.

As shown in FIG. 4, there is provided a communications system as described generally above comprising a CoMP control unit (CCU) 200. The cell network is composed of 3 Transmission/Reception Points 421, 422, 423. There are 5 User Equipments in the cell as illustrated, 431, 432, 433, 434, 435. The FIG. 5 presents signaling from the CCU to User Equipments of the coordination priority indexes in accordance with the example of FIG. 4.

Generally as discussed above, the CoMP control unit (CCU) 221 may configure and then transmit to a donor (serving) Transmission/Reception Point (TRP) 421, 322, 423 the coordination priority index which is determined as a function of the required Bit Ratefor that specific User Equipment (UE) and the SINR or the CQI. The donor Transmission/Reception Point (TRP) then transmits the coordination priority indexes sent by the CCU to the corresponding User Equipment (UE)s. The configuration of the coordination priority index allows the User Equipment (UE) to select a subset of Channel State Information (CSI) reports or Channel State Information (CSI) quantities to report so that the threshold index of the coordination priority is met.

Figure 5:
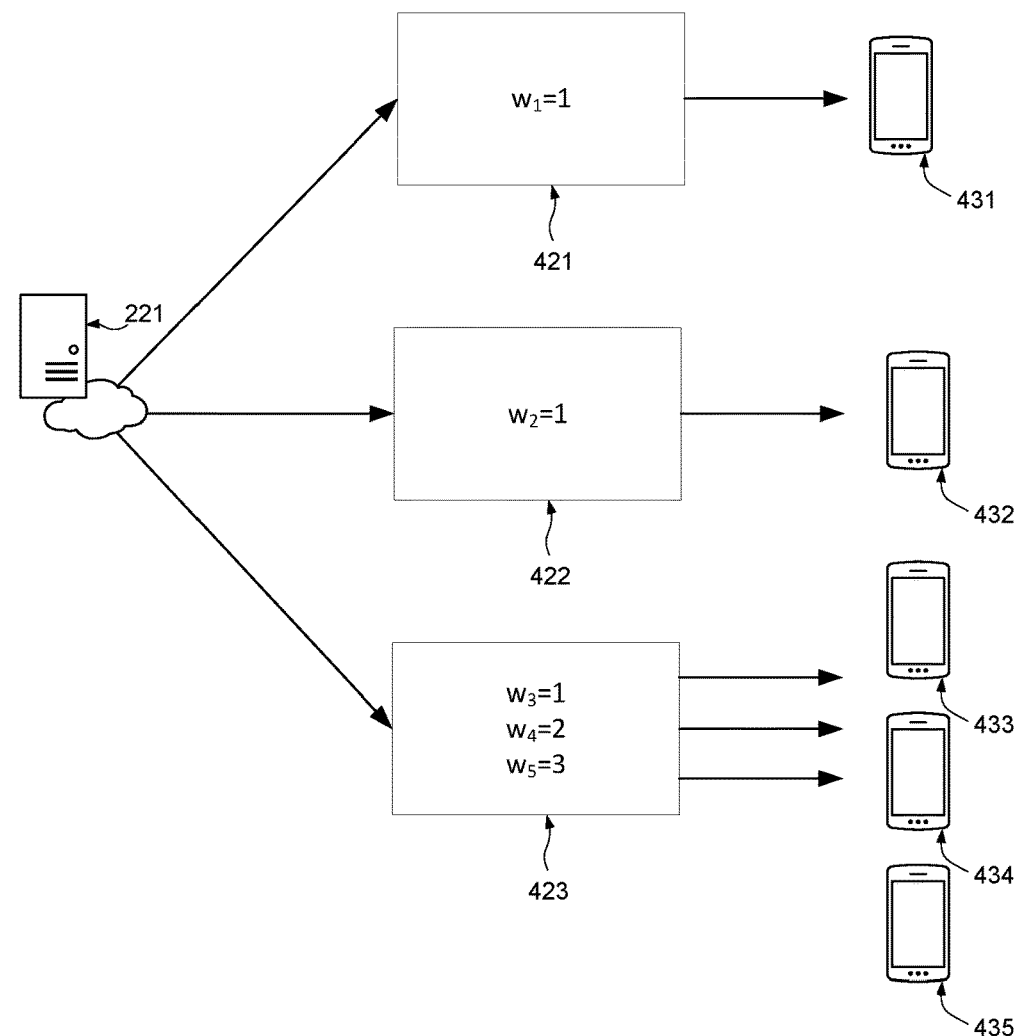
FIG. 5 presents signaling from the CCU to User Equipments of the coordination priority indexes in accordance with the example of FIG. 4.

As shown in FIG. 5, the CCU configures first and then transmits then the coordination priority indexes of users ($\omega_k$) to the respective User Equipments as shown in FIG. 5, like elements being numbered alike with respect to FIG. 4. The coordination priority index ($\omega_k$) can be of value 1, 2, or 3 in this setting. But in general, it can be another value in other settings, bounded by $N_{max}$ which is configured by the CCU and denotes the largest size of cooperation set for each User Equipment (UE) in the network.

Beneficially, configuring and reporting the coordination priority index in this way allows the User Equipment (UE) to select a subset of Channel State Information (CSI) reports or Channel State Information (CSI) quantities to report so that the threshold index of the coordination priority is met.

By way of example, the case of the configuration of the coordination priority of User Equipment 434 is now considered.

First, User Equipment 434 reports to the network the best CQI which associates Transmission/Reception Point (TRP) C. For the sake of this example this CQI has the index 7.

Based on this CQI, the network estimates the SINR of User Equipment 434 (using table 1 above in this example, although other mechanism may be used as described);

$$CQI7 \rightarrow SINR = 4.694 \, dB.$$

User Equipment 434 is said to be satisfied if its available throughput is above the guaranteed bit rate (GBR) for its service (the bit rate that can be expected to be provided by a GBR bearer). This Guaranteed flow bit rate is contained in each QoS flow description.

Let's say that this guaranteed bit rate is equal to 4 bits/s/Hz.

The network calculates the coordination priority index as:

$$w_4 = GBR4/\log2(1 + SINR) = 4/\log2(1 + 2.947) = 2.02, \text{ rounded to } 2$$

Taking the ceiling value, $w_4=2$ is the coordination priority index to be sent to User Equipment 434

User Equipment 434 receives the index/threshold w4=2. This means that User Equipment 434 will be served at the same time by at maximum 2 cooperative Transmission/Reception Points.

As User Equipment 434 can measure the average received power from all Transmission/Reception Points in the cell, and as User Equipment (UE) 4 is informed to be served by at most two cooperative Transmission/Reception Points (because the index/threshold=2), User Equipment 434 is expected to submit Channel State Information reports that correspond to the Joint Transmission scenario (i.e. the two Transmission/Reception Points exhibiting the best channel characteristics as seen by UE 434, which referring to FIG. 4 would indicate the cooperative set of Transmission/Reception Points is {TRP 421, TR423}

Accordingly the Channel State Information (CSI) reporting overhead is reduced by allowing a User Equipment (UE)

to select one or more Channel State Information (CSI) reports amongst the configured transmission/interference hypotheses.

Simulation results may be obtained based on the embodiments of FIG. 2 or 3 relating to the implementation and usage of the coordination priority of users at the CCU to provide clustering decisions. For the proposed algorithm with the coordination priority of users, back-haul traffic and network traffic are evaluated and compared with the prior art N-best way scheme where the user is associated with the N strongest Transmission/Reception Point (TRP)s, and the best power cooperation where the user is associated with Transmission/Reception Point (TRP)s whose RSRPs are beyond the threshold $P_{th}$.

The performance of a system as presented in FIG. 1 may be simulated on the basis of suitable parameters such as those shown in table 2 below for example on the basis of Monte Carlo simulations, with the locations of small cells and users generated for each simulation.

TABLE 2

| Simulation parameters | |
|---|---|
| Parameter | Value |
| Number of Transmission/Reception Point (TRP)s | 20 |
| Transmit power | 1 W |
| Noise Power | −95 dBm |
| Maximum number of PRBs at an Transmission/Reception Point (TRP) | 25 |
| Minimum traffic of users | 4 bits/s/Hz |
| Path loss model for small cell | 140.7 + 37.6 log 10 (r), r in km |

Figure 6:
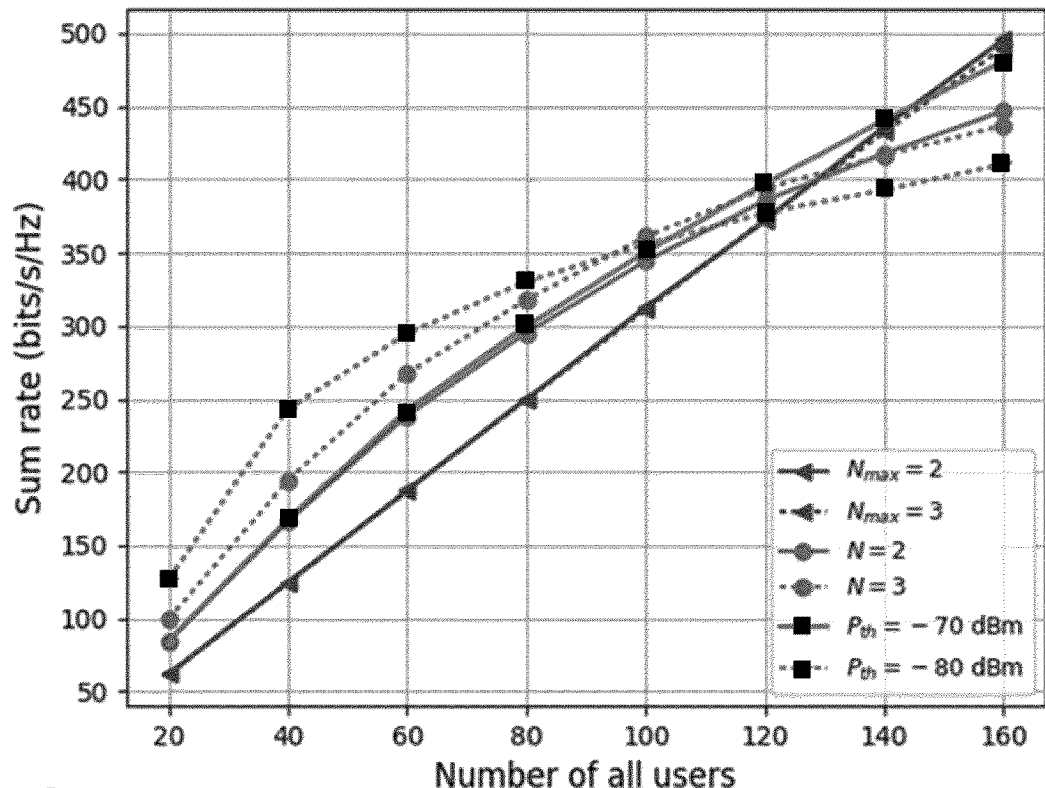
FIG. 6 shows a set of simulated achievable sum rates with respect to the number of users in the macro cell based on a number of different reporting strategies.

FIG. 6 shows a set of simulated achievable sum rates with respect to the number of users in the macro cell based on a number of different reporting strategies.

As shown, the sum rate in Bits/s/Hz is plotted on the y axis against the number of all users on the x axis. Six different reporting schemes are considered, as summarized in table 3 below:

TABLE 3

| Reporting scheme | Plot in FIG. 6 |
|---|---|
| 1. Embodiments, $N_{max} = 2$ | Continuous line, triangular markers |
| 2. Embodiments, $N_{max} = 3$ | Dotted line, triangular markers |
| 3. N Best way, N = 2 | Continuous line, circular markers |
| 4. N Best way, N = 3 | Dotted line, circular markers |
| 5. best power cooperation scheme Pth = −70 dBm | Continuous line, square markers |
| 6. best power cooperation scheme Pth = −80 dBm | Dotted line, square markers |

Schemes 1 and 2 are embodiments of the invention additionally implementing clustering based on CPI values as discussed above.

$N_{max}$ denotes the maximum number of Transmission/Reception Points associated to one user in simulations based on embodiments as discussed above. Results are compared with that of the N-best way where N is the fixed number of Transmission/Reception Point (TRP)s serving one user, and also compared with the best power cooperation scheme where $P_{th}$ is the power threshold.

In FIG. 6, it can be seen that the achievable sum rate of the proposed scheme increases linearly with the number of users in the network. However, the ceiling effect is well-observed in the other schemes. Indeed, the sum rate flattens for high number of users and does not improve. This behavior is expected by cause of the radio resources limitation in the network.

Figure 7:
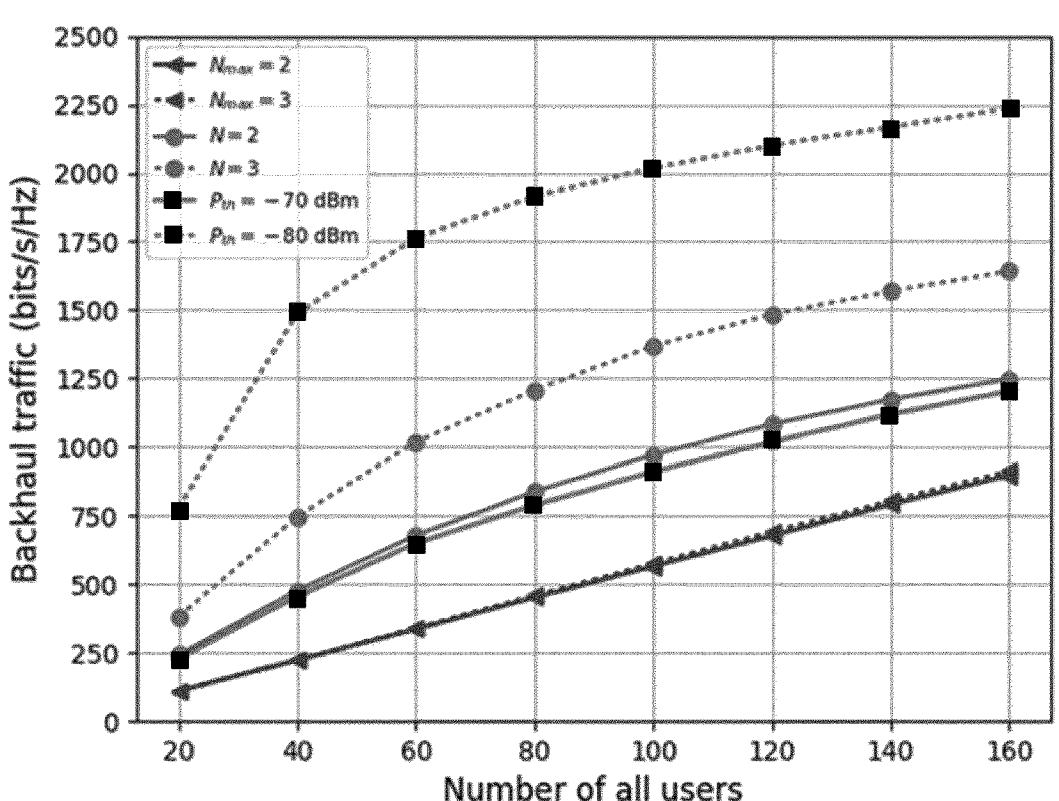
FIG. 7 shows a set of simulated network back-haul traffic data, increasing with respect to the number of users in the macro cell based on the different reporting strategies of FIG. 6.

FIG. 7 shows a set of simulated network back-haul traffic data, increasing with respect to the number of users in the macro cell based on the different reporting strategies of FIG. 6.

As shown, the backhaul traffic in Bits/s/Hz is plotted on the y axis against the number of all users on the x axis. Six different reporting schemes are considered, as summarized in table 3 above:

As shown, the network back-haul traffic of the N-best way scheme and the best power cooperation is much larger than that of the proposed scheme. In fact, the priority-resource-limited CoMP algorithm varies the number of Transmission/Reception Point (TRP)s associated with each user, and therefore, it provides only necessary resource blocks.

Figure 8:
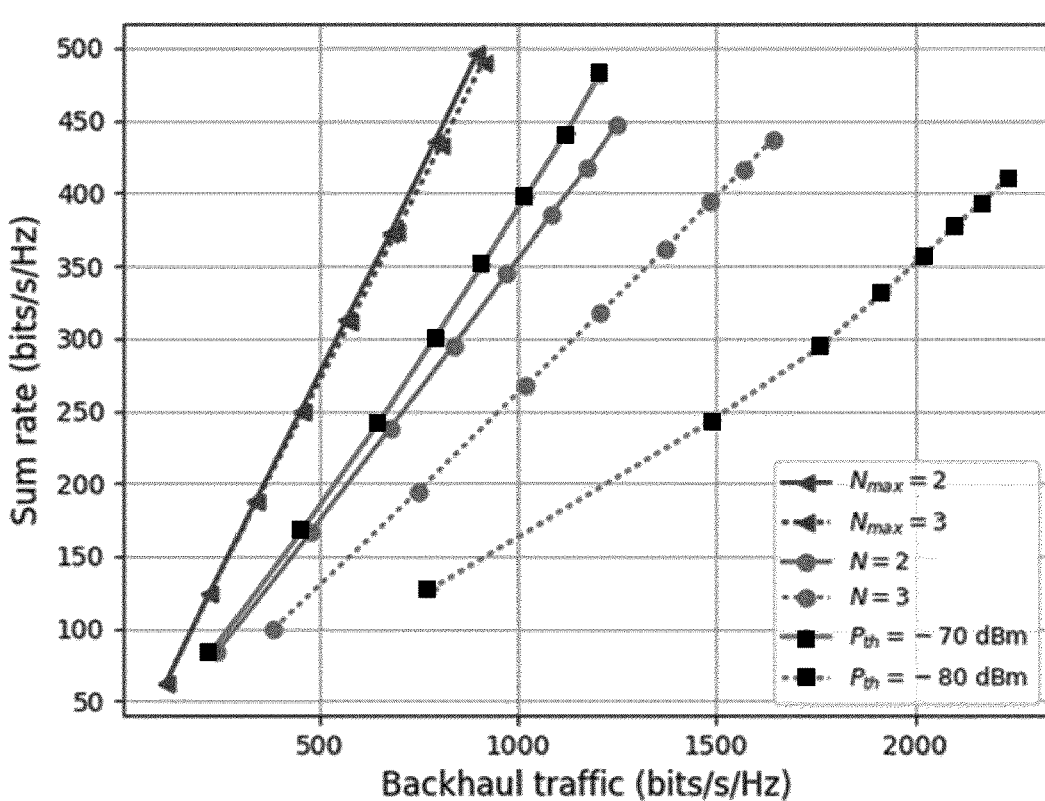
FIG. 8 shows the achievable sum rate as a function of the network back-haul traffic based on the different reporting strategies of FIG. 6.

FIG. 8 shows the achievable sum rate as a function of the network back-haul traffic based on the different reporting strategies of FIG. 6.

As shown, the sum rate traffic in Bits/s/Hz is plotted on the y axis against the Backhaul traffic on the x axis. Six different reporting schemes are considered, as summarized in table 3 above:

It is well-observed that the proposed algorithm reaches the requested sum rate with less back-haul traffic compared to the other schemes. This confirms that the coordination priority of users comes into play to save more radio resources in the network.

Figure 9:
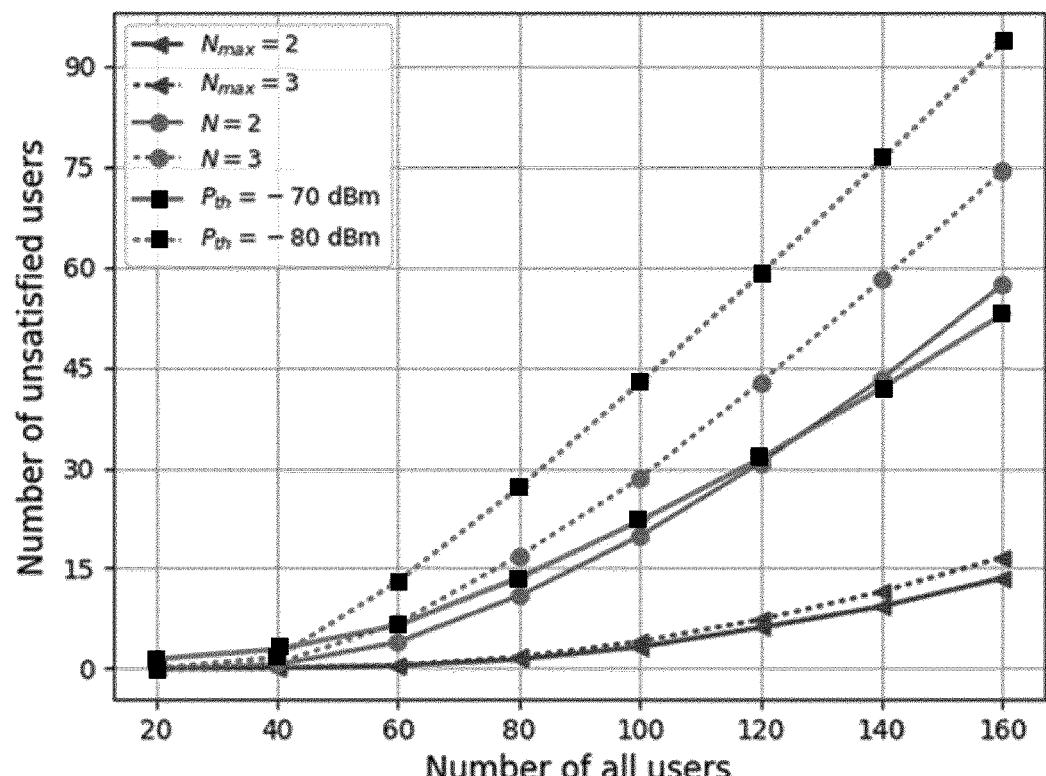
FIG. 9 shows fairness in terms of as a function of the number of unsatisfied users compared to the total number of users based on the different reporting strategies of FIG. 6.

FIG. 9 shows fairness in terms of as a function of the number of unsatisfied users compared to the total number of users based on the different reporting strategies of FIG. 6.

As shown, the number of unsatisfied users is plotted on the y axis against the total number of users on the x axis. Six different reporting schemes are considered, as summarized in table 3 above:

As show the simulations based on embodiments as discussed above the number of unsatisfied users is lower for all values of total number of users than the number of unsatisfied users achieved by any of the other reporting schemes.

Embodiments have been presented above in terms of a method. The skilled person will recognize that all features described above are suitable for implementation in suitably configured hardware. Aspects of the disclosed approach can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. It may be considered that in this context, a User Equipment may be considered to be a computer. Similarly, the CCU may be considered to be a computer, and the CCU in cooperation with other components of the system as described herein be considered to be a distributed computer system.

In particular, there may be provided a cellular communications system comprising a plurality of Transmission/Reception points, in which a user equipment may be in simultaneous respective communications with multiple Transmission/Reception points, the communications being coordinated on the basis of the channel state information transmitted by the user equipment. Such a system may be adapted to receive a channel quality indicator from the user equipment representative of a Signal to Interference and Noise Ratio of a communication, where the channel quality indicator is the channel quality indicator associated with a preferred channel, the preferred channel being the one of the communications having highest channel quality, to determine a coordination priority index proportional to a Bit Raterequirement associated with the user equipment and inversely proportional to the Signal to Interference and Noise Ratio, rounded to an integer. The system may be further adapted to transmit the coordination priority index to the user equipment, and wherein the user equipment is configured to transmit channel state information relating to respective communications, where the communications with respect to which channel state information is transmitted correspond to communications having the highest channel state information values, and where the number of communication channels with respect to which channel state information is transmitted is equal to or less than the coordination priority index.

Similarly a user equipment may be adapted to transmit a channel quality indicator representative of a Signal to Interference and Noise Ratio of a communication, where the channel quality indicator is the channel quality indicator associated with a preferred channel el being the communication having highest channel quality. The user equipment may be further adapted to receive a coordination priority index (e.g. from the CCU), the coordination priority index being proportional to a Bit Raterequirement associated with user equipment and inversely proportional to the Signal to Interference and Noise Ratio, rounded to an integer, and the user equipment is further adapted to transmit channel state information relating to respective said communications (e.g. to the CCU), where the communications with respect to which channel state information is transmitted correspond to the communications having the highest channel state information values, and where the number of communication channels with respect to which channel state information is transmitted is equal or less than the coordination priority index.

Accordingly there is provided a priority-resource-limited CoMP scheme based on a coordination priority index of users which comes into play to perform cooperation set selection and resource allocation in small cell networks. The CoMP control unit (CCU) configures and then transmits to the donor (serving) Transmission/Reception Point (TRP) the coordination priority index which is determined as a function of the required Bit Ratefor that specific User Equipment (UE) and the SINR or the CQI. The donor Transmission/Reception Point (TRP) then transmits the coordination priority indexes sent by the CCU to the corresponding User Equipment (UE)s. The configuration of the coordination priority index allows the User Equipment (UE) to select a subset of Channel State Information (CSI) reports or Channel State Information (CSI) quantities to report so that the threshold index of the coordination priority is met.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of communicating channel state information in a cellular communications system comprising a plurality of Transmission/Reception points, wherein a user equipment may be in simultaneous respective communications with multiple said Transmission/Reception points, said communications being coordinated on the basis of said channel state information transmitted by said user equipment, said method comprising:

receiving a channel quality indicator from said user equipment representative of a Signal to Interference and Noise Ratio of a said communication, where said channel quality indicator is the channel quality indicator associated with a preferred channel, said preferred channel being the one of said communications having highest channel quality, determining a coordination priority index proportional to a Bit Rate requirement associated with said user equipment and inversely proportional to said Signal to Interference and Noise Ratio, rounded to an integer, transmitting said coordination priority index to said user equipment, and said user equipment transmitting channel state information relating to respective said communications, communications with respect to which channel state information is transmitted correspond to communications having the highest channel state information values, and where the number of communication channels with respect to which channel state information is transmitted is equal to the coordination priority index.

2. The method of claim 1 comprising the further steps of transmitting selection criteria to said User Equipment, and said User Equipment applying said criteria to define said transmitted channel state information as a selection of a subset of Channel State Information reports and/or Channel State Information quantities.

3. The method of claim 1, wherein said system is further configured to assign communications of a said User Equipment to a plurality of Transmission/Reception points, with regard to the reported Channel State Information of the respective said User Equipment, and the coordination priority index of the respective said User Equipment.

4. The method of claim 3, said step of assigning communications of a said User Equipment to a plurality of Transmission/Reception points comprises preferentially assigning multiple Transmission/Reception points to a user equipment with a higher coordination priority index over a user equipment with a lower coordination priority index.

5. The method of claim 1, wherein said Signal to Interference and Noise Ratio is determined on the basis of a predetermined mapping of channel quality indicator values to Signal to Interference and Noise Ratio values.

6. The method of claim 1, wherein said Signal to Interference and Noise Ratio is determined by a calculation corresponding to the type of said user equipment.

7. The method of claim 1, wherein said coordination priority index is equal to a Bit Rate requirement associated with said user equipment divided by the sum rate of said preferred channel, rounded to an integer.

8. A non-transitory computer-readable medium storing a computer program comprising instructions which, when the computer program is executed by a computer, cause the computer to carry out the method of claim 1.

9. A method of communicating channel state information in a cellular communications system comprising a plurality of Transmission/Reception points, wherein a user equipment may be in simultaneous respective communications with multiple said Transmission/Reception points, said communications being coordinated on the basis of said channel state information transmitted by said user equipment, said method comprising:

said user equipment transmitting a channel quality indicator representative of a Signal to Interference and Noise Ratio of a said communication, where said channel quality indicator is the channel quality indicator associated with a preferred channel, said preferred channel being the one of said communications having highest channel quality, receiving a coordination priority index at said user equipment, said coordination priority index being proportional to a Bit Rate requirement associated with said user equipment and inversely proportional to said Signal to Interference and Noise Ratio, rounded to an integer, and said user equipment transmitting channel state information relating to respective said communications, communications with respect to which channel state information is transmitted correspond to communications having the highest channel state information values, and where the number of communication channels with respect to which channel state information is transmitted is equal or less than the coordination priority index.

10. The method of claim 9 comprising the further steps of receiving selection criteria at said User Equipment, and said User Equipment applying said criteria to define said transmitted channel state information as a selection of a subset of a Channel State Information reports and/or Channel State Information quantities.

11. A cellular communications system comprising a plurality of Transmission/Reception points, wherein a user equipment may be in simultaneous respective communications with multiple said Transmission/Reception points, said communications being coordinated on the basis of said channel state information transmitted by said user equipment, said system being adapted:

to receive a channel quality indicator from said user equipment representative of a Signal to Interference and Noise Ratio of a said communication, where said channel quality indicator is the channel quality indicator associated with a preferred channel, said preferred channel being the one of said communications having highest channel quality, to determine a coordination priority index proportional to a Bit Rate requirement associated with said user equipment and inversely proportional to said Signal to Interference and Noise Ratio, rounded to an integer, to transmit said coordination priority index to said user equipment, and wherein said user equipment is configured to transmitting channel state information relating to respective said communications, where the communications with respect to which channel state information is transmitted correspond to communications having the highest channel state information values, and where the number of communication channels with respect to which channel state information is transmitted is equal to the coordination priority index.

12. A user equipment for use in a cellular communications system comprising a plurality of Transmission/Reception points, wherein a user equipment may be in simultaneous respective communications with multiple said Transmission/Reception points, said communications being coordinated on the basis of said channel state information transmitted by said user equipment, wherein:

said user equipment is adapted to transmit a channel quality indicator representative of a Signal to Interference and Noise Ratio of a said communication, where said channel quality indicator is the channel quality indicator associated with a preferred channel, said preferred channel being the one of said communications having highest channel quality, said user equipment is further adapted to receive a coordination priority, said coordination priority index being proportional to a Bit Rate requirement associated with said user equipment and inversely proportional to said Signal to Interference and Noise Ratio, rounded to an integer, and said user equipment is further adapted to transmit channel state information relating to respective said communications, communications with respect to which channel state information is transmitted correspond to communications having the highest channel state information values, and where the number of communication channels with respect to which channel state information is transmitted is equal to the coordination priority index.

* * * * *